June 8, 1965 C. J. BAUDER ETAL 3,187,489
SPACE FILTER

Filed Sept. 9, 1960 3 Sheets-Sheet 1

INVENTORS
CARL J. BAUDER
ROBERT G. QUICK, JR.
BY
ATTORNEY

INVENTORS
CARL. J. BAUDER.
ROBERT. G. QUICK, JR.

ATTORNEY

June 8, 1965 C. J. BAUDER ETAL 3,187,489
SPACE FILTER

Filed Sept. 9, 1960 3 Sheets-Sheet 3

INVENTORS
CARL. J. BAUDER,
BY ROBERT. G. QUICK, JR.

ATTORNEY

United States Patent Office 3,187,489
Patented June 8, 1965

3,187,489
SPACE FILTER
Carl J. Bauder and Robert G. Quick, Jr., Syracuse, N.Y., assignors to Cambridge Filter Corporation, a corporation of New York
Filed Sept. 9, 1960, Ser. No. 55,087
7 Claims. (Cl. 55—499)

This invention relates to space filters and more particularly to filters employing a pleated filter medium which is readily replaceable as a cartridge.

In space filters of the type referred to there is provided a permanent frame and wire grid structure adapted to complementally support pleated filter material, the latter being formed as a replaceable cartridge for ready disposal and replacement, as often as the filter medium becomes inefficient through contamination with foreign matter. Such a filter is disclosed in Patents 2,907,407 and 2,907,408, issued October 6, 1959, wherein the replaceable cartridges are formed so as to nicely interfit, in a complemental fashion with the permanent supporting grid structure. The cartridges therein disclosed are provided with rigid, spaced rectangular side panels to which the opposite edges of the pleated filter material are secured by an adhesive sealing composition, the panels being adapted to flank the opposed ends of corresponding V grids of the permanent grid supporting structure. In practice the side panels have formed a part of a rigid frame structure having relatively rigid end panels to which the two opposite ends of the filter media are secured by an adhesive sealing composition. Such cartridges, so formed with rigid side and end panels provide a cartridge which interfits with the grid structure in such a way as to provide ready replacement, by the mere withdrawal of one cartridge and its replacement by another.

Such cartridges are bulky, and vulnerable to damage during shipment if packed without adequate protection to resist unwarranted shocks and impacts during shipment such as would tend to distort the frame panels. In addition the pleated material in such a cartridge, which is unsupported by a frame and grid structure during shipment may if, accidentally dropped, be subjected to unwarranted impacts such as may damage the adhesive seal between the media and frame panels.

It is an object of the present invention to provide a cartridge for such space filters that may be shipped in a collapsed form, whereby the bulk, and strain incident to unwarranted shocks in handling and shipping are eliminated.

It is a further object of the invention to provide a cartridge which takes advantage of the pleated form of the filtering media, of which the cartridge is composed and employs the flexibility of such media, whereby the bulk of the cartridge is reduced for shipping or storage purposes by closing in on the pleat spacing.

It is still a further object of the invention to provide a filter cartridge of the type described wherein the side walls thereof to which the side edges of the pleated media are adhesively sealed are formed of flexible pliant material readily capable of folding in a bellows or accordion fashion.

Yet another object of the invention is to provide a filter cartridge of the type described wherein the side panels to which the side edges of the pleated media is adhesively sealed are adapted to fold in a bellows manner, and wherein the end panels of a rigid material may be moved toward each other to compress the pleated filter material in bellows fashion to substantially lessen the bulk of a filter cartridge during shipping or storage.

Yet another object of the invention is to provide a filter cartridge of the type described wherein the pleated filter media has its side edges adhesively and sealingly secured to flexible pliant side panels and its two opposite end edges secured to relatively rigid end panels, and wherein the flexible side panels are secured to the end panels to provide a means for properly spacing the end panels when the carriage is expanded to shape for installation upon a supporting grid structure and to prevent danger of imparting any undue strain on the filter media.

Another object of the invention is to provide in a frame and grid support structure and a collapsible bellows cartridge structure, suitable means for readily assuring a proper air seal between the frame and the cartridge.

The above and other novel features of the invention will appear more fully hereinafter from the following detailed description when taken in conjunction with the accompanying drawings. It is expressly understood that the drawings are employed for purposes of illustration only and are not designed as a definition of the limits of the inventon, reference being had for this purpose to the appended claims.

In the drawings wherein like reference characters indicate like parts:

Figure 1:
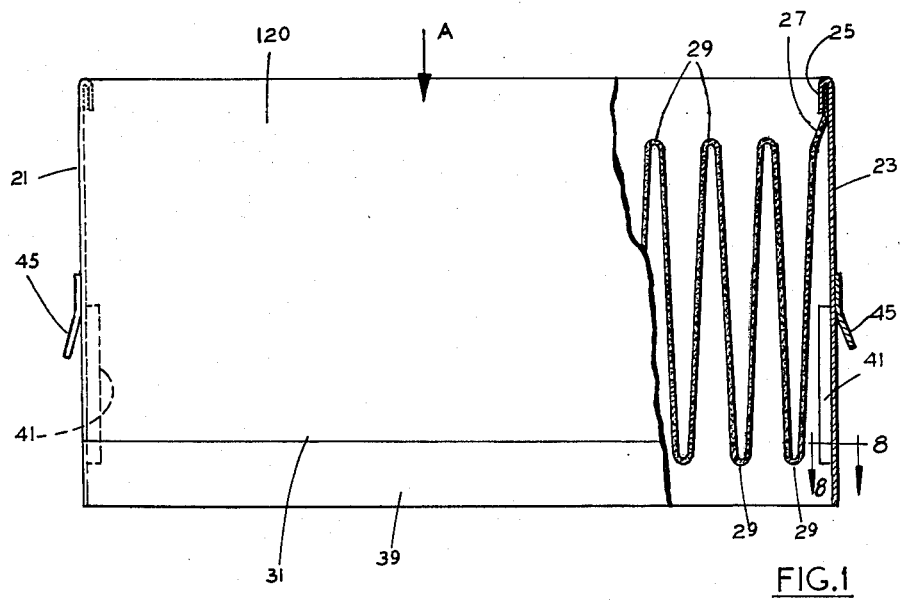
FIGURE 1 is a side elevation of a filter cartridge with a portion shown in section.
Figure 2:
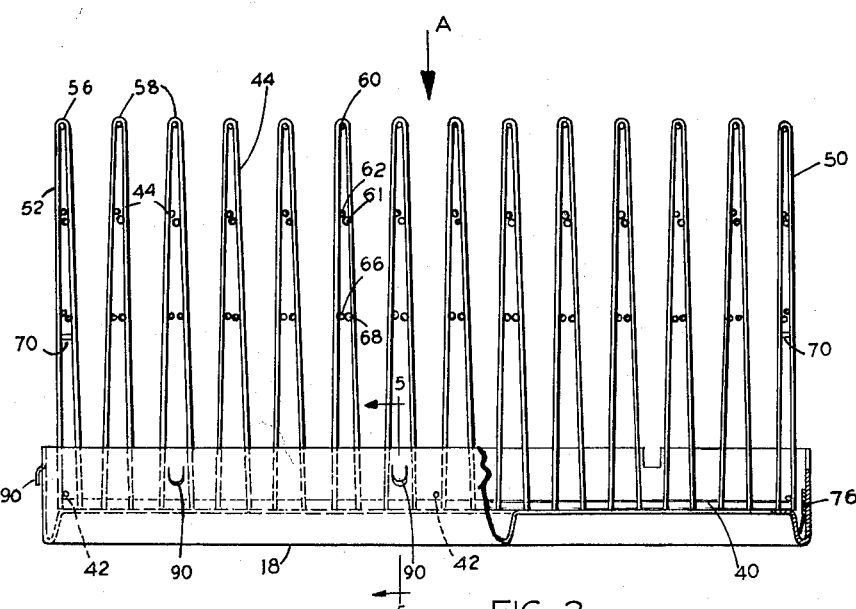
FIGURE 2 is a side elevation of a frame and wire grid support for the cartridge shown in FIGURE 1.
Figure 8:
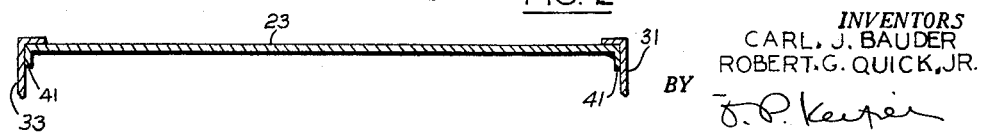
FIGURE 8 is a fragmentary sectional view of a filter cartridge taken substantially on the line 8—8 of FIGURE 1.
Figure 3:
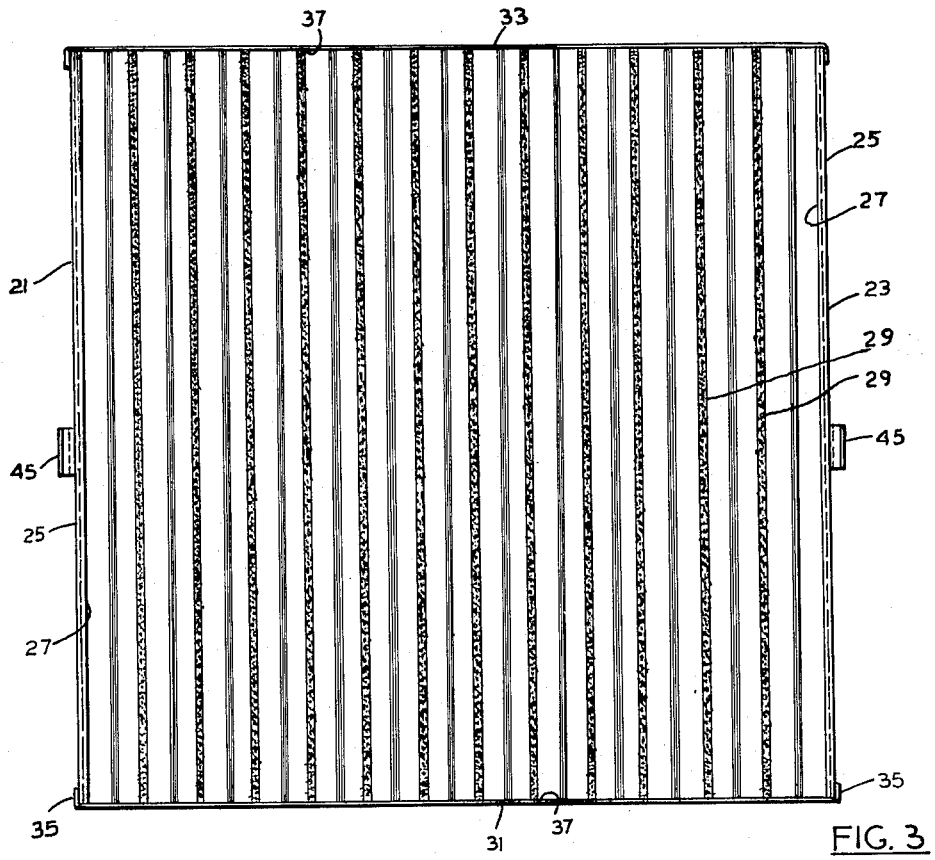
FIGURE 3 is a top plan view of the cartridge of FIGURE 1, in expanded form ready for installation upon a frame and wire grid.
Figures 5, 6:
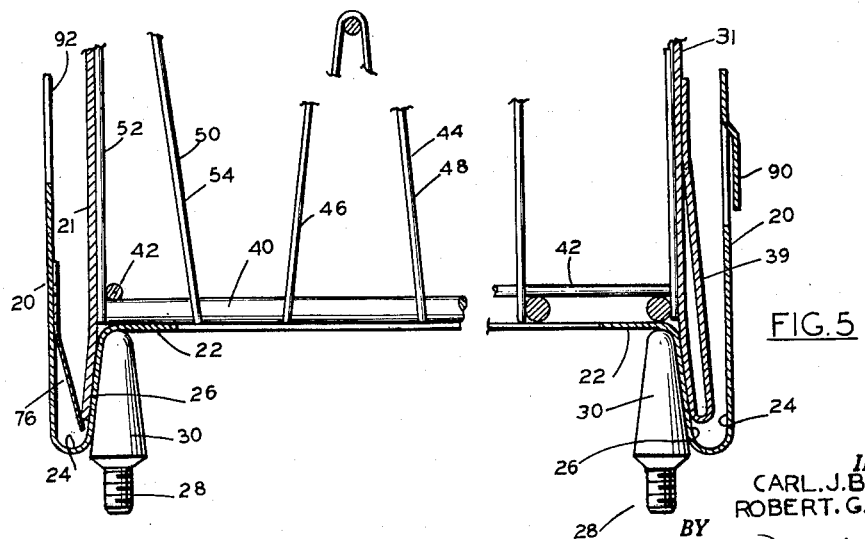
FIGURE 5 is an enlarged fragmentary sectional view taken through a frame side on the line 5—5 of FIGURE 2, and with the corresponding part of the cartridge side shown in section.
FIGURE 6 is an enlarged fragmentary sectional view taken through a frame end on the line 6—6 of FIGURE 4 and with the corresponding part of the cartridge end shown in section.
Figure 4:
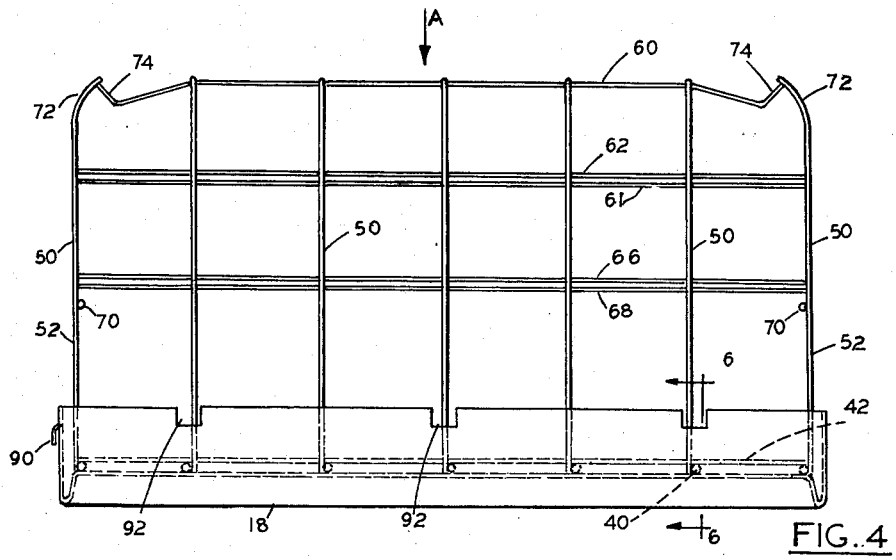
FIGURE 4 is an end elevation of the grid structure of FIGURE 2.
Figure 7:
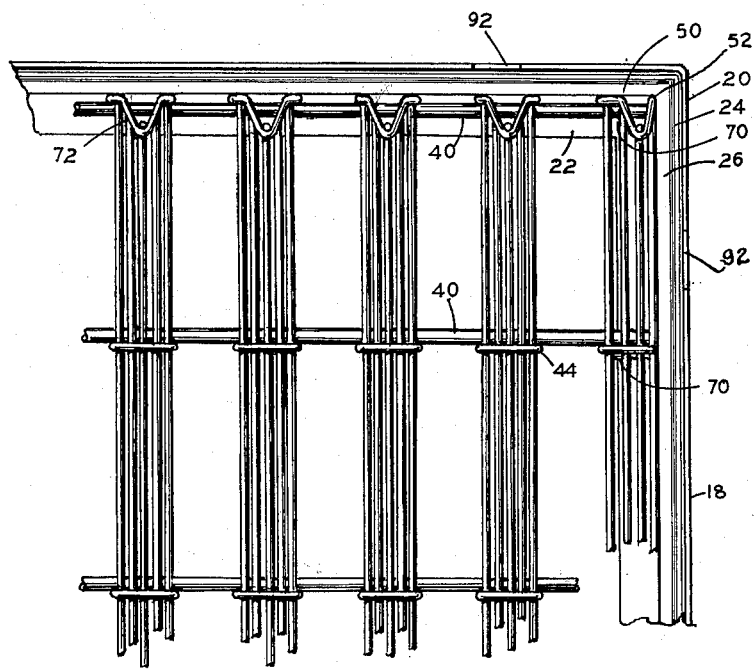
FIGURE 7 is a fragmentary top plan view of one corner of the grid and frame.

In FIGURES 1, 2 and 3 there are shown a cartridge 120, and a support grid structure 22. The cartridge comprises end members 21 and 23 formed of relatively stiff chip board or the like, the upper inlet edges of which are folded as at 25 over the ends of the filter media 27, which media is formed into a series of deep pleats 29 intermediate the ends. Joining the end members 21 and 23 are flexible sides 31 and 33 formed of vinyl plastic sheeting. The ends are lapped over the edges of end members 21 and 23, as at 35 and the side edges of the pleated filter material are secured to the vinyl side members by adhesive 37 extending continuously along the length of the pleat edges as shown in FIGURE 1, the lower ends or outlet edges of the end members 21 and 23, and the lower edges of the flexible sides 31 and 33 extend below the lower folds of the pleats 29 and form a cartridge skirt portion. The depth of the pleats 29 is substantially greater than the distance that the skirt portions extend beyond the lower ends of pleats 29. The filter media comprises a flexible sheet of fiber glass filter media or the like, and the vinyl sides, may be of about 4 mil thickness. The flexibility of the side members, and the media permit the sides and media to be compacted bellows like by bringing the end members toward one another, so that the cartridge may be compacted for shipping and storage purposes, and expanded for installation. The lower edge of the vinyl sides, at their downstream edges, are provided with a deep hem, 39 and the end members 21 and 23 may have narrow inwardly bent flanges 41 along a portion of their side edges to strengthen the attachment of the vinyl to the end members, and to provide a channel like guide for engaging the supporting grid corner wires. Reinforced tapes 45 adhesively or otherwise secured to the end members 21 and 23 provide handle grips, to assist one in expanding the collapsed cartridge to full installation size, and to provide a grip for the installation and removal of the cartridge, upon the supporting grid.

The supporting grid structure comprises a rectangular frame 18, having an outer skirt portion 20, and an inwardly extending flange 22, formed to provide a deep rectangular pocket 24 with a sloping wall 26, to receive the end members 21 and 23 and hemmed edges 39 of the cartridge referred to. The frame may be formed of one piece, the skirt portion having a right angle bend at the corners, with the inwardly extending flange parts mitered at the corners. The frame may be referred to as a channel, the skirt portion 20 forming one wall, the sloping wall 26 forming the inner wall and the deep pocket 24 forming a connecting web.

Threaded fastening studs 28, having tapered shanks 30 are welded into each corner to the sloping walls 26, the welding sealing the mitered abutting edges of the flange, except for the mitered loop and lateral flange portions which are separately welded to provide an air tight frame.

Seated on the flange 22 is a grid structure having a base composed of seven equally spaced parallel rods 40 extending from the flanges 22 at opposite ends of the frame. The two rods on opposite sides lie along the outer edges of the opposite side flanges 22, and the seven rods are tied together at their center end by cross wires 42. Extending upwardly from the rods 40 are a plurality of stiff "V" wires 44, the lower inclined ends 46 and 48 of which are welded to the outside of the outer two rods 40, and to one side of the remaining intermediate rods 40. At the ends, "V" wires such as 50, having their lower ends 52 and 54 more closely spaced than the "V" wires 44, and having the ends 52 extending vertically from the plane of the frame, while the ends 54 are inclined similarly to the inclination of the V wires 48 and 46, are welded to the rods 40.

The "V" wires 44 and 50 are all of the same height and arranged in rows from side to side of the filter frame, with uniform spacing between the upper apex ends 56 and 58 of the adjacent rows, the spacing corresponding to and being complemental with the pleats of the cartridge, when fully extended for application to the grid support. Each of the rows of V wires 44 and 50 are provided with tie wires 60, 62, 61, 66 and 68 extending the length of each row, and the end V wires 50, are provided with short strut elements 70 intermediate their height to provide rigidity of the opposite end rows formed by the "V" wires 50.

The outer "V" wires 44 and 50, rising up from the outer bars 40 are curved inwardly at their loop ends as is indicated at 72, and the tie wires 60 are shortened by being provided with a knee bend 74 which also provides a degree of yield. The inwardly curved loop ends facilitate applying a cartridge to the supporting grid.

The opposite corner wires 52 of the V wires 50 at opposite ends are adapted to ride within the channel formed by the cartridge end members 21 and 23, and the inturned flanges 41.

The opposed end pockets of the frame are provided with resilient blade members 76 extending across the end filter frame, which are adapted to engage the outside of the relatively rigid end members 21 and 23 of the filter cartridge, to press the lower edges thereof in sealing engagement with the inclined wall 26, and the hem portions of the vinyl sides are adapted to be drawn taut by the expanding effect of the opposite end inclined walls 26 which tend to spread the end members 21 and 23. The filter unit is designed to be installed so that the air stream enters, as indicated by the arrow A, so that the cartridge when installed on the supporting frame and "V" grids is subjected to a pressure differential resulting from the pressure drop caused by the air flow through the media, and such pressure differential exerts a higher pressure on the outside of the hem portions of the vinyl sides, whereby to cause the lower hem edges to rest against the inclined surfaces 26 of the frame.

Filters of the type referred to are often installed in vertical bands with a large number of frames disposed adjacent one another. In order to facilitate installation, the frames are all of the same size, and rectangular or square. To provide suitable interlocks between adjacent frames, a end and adjacent side of each frame are provided with struck out tongues such as 90, which are adapted to interlock with notches correspondingly spaced as at 92 in the other side and end of adjacent frames, the interlock being such as to hold the adjacent frame members together in air tight fashion with caulking compound between frames.

It will be understood, that the "V" grid wires and tie wires prevent collapse of the adjacent flanks of the filter media pleats. It will also be understood that the end edges, and side edges of the filter media will be continuously sealed in air tight manner with the respective end and flexible side members.

It will be seen that the flexible side walls of the cartridge will readily fold in a somewhat bellows fashion, the material doubling up and folding inward or outward between the pleats, the folds or doubling up extending from beneath each pleat fold to the far edge, and the successive folds alternatingly extending to one edge or the other of the side walls. Thus a filter cartridge which would be two feet square and a foot deep when installed, can be compacted to a size two feet wide, a foot deep, and a matter of several inches between the end members 21 and 23. When the cartridge is expanded, the flexible side members determine the maximum and proper expansion, and protect the filter media from any strain. The flexible side members, being rectangular when expanded, assure that the cartridge ends 21 and 23 when expanded, are squared up in relation to the cartridge as a whole, so that the unit will slide in place on the supporting frame, as readily as a cartridge whose frame is rigid. When inserted into position the inclined portions of the frame tend to spread the lower edges of the end members 21 and 23, and tension the hem portions of the side members, so that, the pressure drop through the filter media will hold the hem portions seated upon the frame in sealing relation. While the frame and a cartridge has been illustrated in a horizontal position, actually in installation, especially when in banks, the frames are disposed vertically, and the cartridges when installed, have their flexible panels stretched out in horizontal planes, with the pleat folds extending vertically.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A filter support construction and a complemental filter cartridge having flexible filter material arranged in pleats disposed transversely of flexible side walls and extending from relatively rigid end walls, comprising, a rectangular open frame having end members and connecting side members, a plurality of upstanding V sectioned wire grids extending across said frame to support the pleats of a complemental filter cartridge, and a V sectioned wire grid at opposite ends of the frame, having corner and intermediate end wires extending vertically from said frame, and means for rigidifying said end wires, a filter cartridge disposed on said wire grids, having relatively stiff end panels engaging said vertically extending end wires, pleated filter material complementally supported on said V grids, with its opposite ends secured to the outer edges of said end panels, and flexible pliant substantially rectangular side panels connecting the side edges of said end panels and having the side edges of said filter material sealingly secured to the inside surface of said pliant panel side panels, said frame having an outwardly inclined sealing portion extending oppositely from said upstanding V grids and a skirt portion exterior thereof, and said cartridge end and side members extending below the lower loops of said pleated filter material, and sealingly engaging the inclined sealing portion of said frame, and resilient blade affixed along one edge of the skirt portions of said end members and bearing against the outer surface of the cartridge end members extending below the lower loops to assist in the sealing engagement of the cartridge end members against the inclined sealing portion of the frame end members.

2. A filter support construction and a complemental filter cartridge having flexible filter material arranged in pleats disposed transversely of flexible side walls and extending from relatively rigid end walls, comprising, a rectangular open frame having end members and connecting side members, a plurality of upstanding V sectioned wire grids extending across said frame to support the pleats of a complemental filter cartridge, and a V sectioned wire grid at opposite ends of the frame, having corner and intermediate end wires extending vertically from said frame, and means for rigidifying said end wires, a filter cartridge disposed on said wire grids, having relatively stiff end panels having narrow side edge flanges engaging said vertically extending corner end wires, pleated filter material complementally supported on said V grids, with its opposite ends secured to the outer edges of said end panels, and flexible pliant substantially rectangular side panels connecting the side edges of said end panels and having the side edges of said filter material sealingly secured to the inside surface of said pliant panel side panels said frame having an outwardly inclined sealing portion extending oppositely from said upstanding V grids and a skirt portion exterior thereof, and said cartridge end and side members extending below the lower loops of said pleated filter material, and sealingly engaging the inclined sealing portion of said frame, and resilient blade means affixed along one edge to the skirt portions of said end members, and bearing against the outer surface of the cartridge end members extending below the lower loops to assist in the sealing engagement of the cartridge end members against the inclined sealing portion of the frame end members.

3. A filter support construction and a complemental filter cartridge having flexible filter material arranged in pleats disposed transversely of flexible side walls and extending from relatively rigid end walls, comprising, a horizontal rectangular open frame having end members and connecting side members, a plurality of upstanding V sectioned wire grids extending across said frame to support the pleats of a complemental filter cartridge, and a V sectioned wire grid at opposite ends of the frame, having corner and intermediate end wires extending vertically from said frame, and means for rigidifying said end wires, a filter cartridge disposed on said wire grids, said filter cartridges having relatively stiff end panels engaging said vertically extending end wires, said stiff end panels each having an inlet edge and an outlet edge, pleated filter material complementally supported on said V grids, with its opposite ends secured to the inlet edge of each of said end panels, and flexible pliant substantially rectangular side panels connecting the side edges of said end panels and having the side edges of said filter material sealingly secured to the inside surface of said pliant panel side panels, said frame having an outwardly inclined sealing portion extending oppositely from said upstanding V grids and a frame skirt portion exterior thereof, and said cartridge end and side members extending below the lower loops of said pleated filter material to form a cartridge skirt portion, and said cartridge skirt portion sealingly engaging the inclined sealing portion of said frame.

4. A filter support construction and a complemental filter cartridge having flexible filter material arranged in pleats disposed transversely of flexible side walls and extending from relatively rigid end walls, comprising, a horizontal rectangular open frame having end members and connecting side members, a plurality of upstanding V sectioned wire grids extending across said frame to support the pleats of a complemental filter cartridge, and a V sectioned wire grid at opposite ends of the frame, having corner and intermediate end wires extending vertically from said frame, and means for rigidifying said end wires, a filter cartridge disposed on said wire grids, said filter cartridge having relatively stiff end panels having side edges, narrow side edge flanges attached to said end panel edges and engaging said vertically extending corner end wires, said stiff end panels each having an inlet edge and an outlet edge, pleated filter material complementally supported on said V grids, with its opposite ends secured to the inlet edge of each of said end panels, and flexible pliant substantially rectangular side panels connecting the side edges of said end panels and having the side edges of said filter material sealingly secured to the inside surface of said pliant panel side panels, said frame having an outwardly inclined sealing portion extending oppositely from said upstanding V grids and a frame skirt portion exterior thereof, and said cartridge end and side members extending below the lower loops of said pleated filter material to form a cartridge skirt portion, and said cartridge skirt portion sealingly engaging the inclined sealing portion of said frame.

5. A filter support construction for a complemental filter cartridge having flexible filter material arranged in pleats disposed transversely of flexible side walls and extending from relatively rigid end walls, comprising, a rectangular horizontal open frame, having end members and connecting side members, a plurality of upstanding V sectioned wire grids extending across said frame to support the pleats of a complemental filter cartridge, and a V sectioned wire grid at oppoiste ends of the frame, said end grid having corner and intermediate end wires extending vertically from said frame, and means for rigidifying said end wires, said frame having an outwardly inclined sealing portion extending oppositely from said upstanding V grids, and a skirt portion exterior thereof, and resilient blade means affixed along one edge to the surface of said skirt portion of said end members, and adapted to bear against the outer surface of the rigid end walls of a cartridge to assist sealing engagement of the cartridge end walls against the inclined sealing portion of the frame end members.

6. A foldable air filter cartridge comprising an elongate rectangular sheet of flexible filter media arranged in pleated formation, a pair of relatively rigid substantially rectangular end members having side edges, an air inlet edge, and an air outlet edge, and flexible rectangular side members of thin flexible pliant sheet material joined to the side edges of said end members to provide a rectangular frame having a depth substantially that of the width of the flexible side members, when the end members are spaced to draw the side members relatively taut, said sheet of pleated filter material having its opposite ends secured adjacent the corresponding air inlet edges of each of said end members respectively, and its opposite side pleat edges secured to said flexible members, said flexible pliant side members and said end members having skirt portions extending beyond the pleats on the air outlet edge of the end members, said pleats having a depth substantially greater than the distance that said skirt portions extend beyond the pleats, said flexible pliant side members being adapted to fold bellowslike between pleats upon contraction of the spacing between the rigid end members, whereby said cartridge may be folded bellows like for storage or shipment and expanded to form a filter cartridge having pleated media and a rectangular frame.

7. A foldable air filter cartridge comprising an elongate rectangular sheet of flexible filter media arranged in pleated formation, a pair of relatively rigid substantially rectangular end members having side edges, an air inlet edge, and an air outlet edge, and flexible rectangular side members of thin flexible pliant sheet material joined to the side edges of said end members to provide a rectangular frame having a depth substantially that of the width of the flexible side members, when the end members are spaced to draw the side members relatively taut, said end members having narrow side edge flanges lying inside of said flexible side members, said sheet of pleated filter material having its opposite ends secured adjacent the corresponding air inlet edges of each of said end members respectively, and its opposite side pleat edges secured to said flexible members, said flexible pliant side members and said end members having skirt portions extending beyond the pleats on the air outlet edge of the end members, said pleats having a depth substantially greater than the distance that said skirt portions extend beyond the pleats, said flexible pliant side members being adapted to fold bellows like between pleats upon construction of the spacing between the rigid end members, whereby said cartridge may be folded bellows like for storage or shipment and expanded to form a cartridge having pleated media and a rectangular frame.

References Cited by the Examiner

UNITED STATES PATENTS

| | | |
|---|---|---|
| 508,394 | 11/93 | Andrews. |
| 635,582 | 10/99 | Pedrick. |
| 836,633 | 11/06 | Cooke. |
| 837,743 | 12/06 | Sly _____ 55—202 X |
| 923,539 | 6/09 | Law. |
| 1,038,223 | 9/12 | Smith _____ 55—378 X |
| 1,504,136 | 8/24 | Patterson _____ 55—364 |
| 1,802,429 | 4/31 | Josephson. |
| 2,080,154 | 5/37 | Strindberg. |
| 2,114,358 | 4/38 | Schwartz. |
| 2,211,382 | 8/40 | Nutting. |
| 2,252,724 | 8/41 | Meyers _____ 55—509 X |
| 2,330,402 | 9/43 | Winokar. |
| 2,394,208 | 2/46 | Schaaf _____ 55—502 X |
| 2,405,293 | 8/46 | Dahlman _____ 55—529 |
| 2,543,556 | 2/51 | Senne _____ 55—376 |
| 2,686,596 | 8/54 | Storms _____ 55—500 X |
| 2,739,667 | 3/56 | Palmore. |
| 2,759,228 | 8/56 | Gordon. |
| 2,778,100 | 1/57 | Lipman. |
| 2,779,431 | 1/57 | McMullen et al. _____ 55—507 X |
| 2,907,407 | 10/59 | Engle et al. |
| 2,907,408 | 10/59 | Engle et al. |
| 2,943,700 | 7/60 | Bub. |
| 2,952,342 | 9/60 | Schnittker. |
| 2,975,863 | 3/61 | Sosnowich _____ 55—372 |
| 2,976,796 | 3/61 | Anthony et al. _____ 55—507 X |
| 2,981,367 | 4/61 | Sprouse _____ 55—501 X |
| 3,017,698 | 1/62 | Hambrecht et al. _____ 55—501 X |
| 3,026,967 | 3/62 | Stevens et al. _____ 210—497 X |

FOREIGN PATENTS

| | | |
|---|---|---|
| 693,390 | 7/40 | Germany. |
| 851,666 | 10/52 | Germany. |
| 401,287 | 10/33 | Great Britain. |
| 482,543 | 3/38 | Great Britain. |
| 808,476 | 2/59 | Great Britain. |
| 1,040,686 | 5/53 | France. |
| 311,189 | 11/55 | Switzerland. |

HARRY B. THORNTON, *Primary Examiner.*

ROBERT F. BURNETT, WALTER BERLOWITZ
*Examiners.*